United States Patent [19]
Widmer

[11] 3,993,901
[45] Nov. 23, 1976

[54] RADIATION DETECTING SYSTEM

[75] Inventor: David Sydney Widmer, Greater Foxes, England

[73] Assignee: Pye of Cambridge Ltd., Cambridge, England

[22] Filed: Jan. 22, 1975

[21] Appl. No.: 543,113

[30] Foreign Application Priority Data
Feb. 7, 1974  United Kingdom.............. 5738/74

[52] U.S. Cl.............................. 250/232; 250/235; 350/269; 356/93; 356/97
[51] Int. Cl.²........................................ G01J 3/42
[58] Field of Search.......... 250/232, 235, 573, 343, 250/350, 351; 350/269; 356/93, 95, 97; 318/128, 132

[56] References Cited
UNITED STATES PATENTS

| | | | |
|---|---|---|---|
| 1,523,149 | 1/1925 | Wheeler | 250/232 X |
| 2,934,647 | 4/1960 | Blake | 250/232 X |
| 3,068,746 | 12/1962 | Vawter | 250/232 X |
| 3,518,002 | 6/1970 | Barringer et al. | 356/93 |
| 3,609,485 | 9/1971 | Dostal | 318/132 |
| 3,853,407 | 12/1974 | Dewey, Jr. | 356/93 X |

*Primary Examiner*—Eugene La Roche
*Attorney, Agent, or Firm*—Frank R. Trifari; Ronald L. Drumheller

[57] ABSTRACT

In a spectrophotometry system, apparatus for modulating radiation in fixed phase relationship with an oscillatory electric signal, comprising a radiation interrupting member connected to an armature torsionally mounted in a magnetic field generated from said oscillatory signal.

6 Claims, 4 Drawing Figures

RADIATION DETECTING SYSTEM

This invention relates to radiation detecting systems in which radiation from a sample impinges on a radiation detector.

Examples of such systems are ultra-violet or visible absorption spectrophotometry, infra-red spectrophotometry, and atomic absorption spectrophotometry systems, in which radiation passes from a radiation source to a photo-detector via a sample in which some of the radiation may be absorbed. In such systems the radiation may pass from at least one source along two "parallel" paths, one of which may include a sample while the other provides a reference signal, to at least one detector.

Other examples of such a system are emission spectrophotometry systems in which radiation generated in the sample (by exitation of the sample so that it produces an emission spectrum) passes to the detector. These include atomic emission spectrophotometry in which a sample may be exited in a flame, ultra-violet (UV) or visible emission spectrophotometry in which the sample may be exited using an electric arc, and fluorescence spectrophotometry in which a sample is exited by irradiation.

In such systems it is common practice to use an arrangement whereby the radiation used is modulated, for example by periodically interrupting or chopping at least one of the radiation beams. Consequently, the signals obtained from the detector(s) are also modulated since the output of the detector will vary in dependence on the intensity of the radiation impinging thereon. The following are examples of systems in which such an arrangement is used. In the context of these examples "light" denotes ultra-violet, visible or infra-red electromagnetic radiation.

a. In an ultra-violet or visible absorption spectrophotometer double-beam system (wherein one light path passes through a sample cell while the other passes through a reference cell), the beams in the two light paths may be chopped alternately so that the detector(s) receives interlaced pulses of the "reference" and "sample" beams. The reference and sample signals from the detector(s) are then processed electronically to produce for example one voltage representing the intensity of light transmitted via the sample cell and another voltage representing the intensity of light transmitted by the reference cell, from which voltages is derived a voltage representing the optical absorbance of the sample. A similar arrangement may be used in an atomic absorption spectrophotometer.

b. In another ultra-violet/visible absorption spectrophotometer double beam system, known as a null-balance system, the beam modulating arrangement is similar to example (a). The interlaced sample and reference beam pulses may fall alternately onto a single detector. If the two beams differ in intensity, a varying signal is obtained from the detector. This signal may be amplified to form an a.c. voltage and used to activate a servo motor which controls an attenuator so as to attenuate the reference and/or sample beams so as to reduce the difference in intensity between the two beams in the manner of a negative feedback loop. The servo motor is also linked to a charge recorder (or other device) so that a signal indicative of the absorbance of the sample can be obtained.

c. In atomic fluorescence spectrophotometry pulses of exciting radiation may be provided, for example at a pulse frequency of 500 Hz, so that intermittent pulses of fluorescent radiation from the sample reach the detector. The signals from the detector are processed to produce a signal indicative of the phenomenon to be measured and independent of the modulation of the radiation.

In most spectrophotometry systems it is necessary or advisable, in order to produce signals representative of the phenomenon to be measured, to ensure that the means which processes the signals from the detector(s) is synchronised in a suitable fashion with the means modulating the radiation. In the above examples (a) and (c) the signals from the detector need to be "demodulated". In a known arrangement of example (c), the detector may be "gated" by signals from the modulating means as part of an arrangement to produce a signal independent of the modulations. In example (a) the signals from the detector which are derived from the sample light path need to be separated from those which are derived from the reference light path, and the means for separating them needs to be synchronised with the modulating means. In example (b) the design of the servo motor may be such that the signals which activate it need to have a specific phase relationship with the mains voltage which powers the motor. The timing of these activating signals is derived from the modulating means, so that the modulating means and the means for processing signals from the detector (which in this case includes the mains-driven servo motor) need to be synchronised.

In spectrophotometry systems, a usual arrangement for modulating the radiation is a rotating disc having one or more sectors removed. A beam of radiation may be blocked by the disc except when a cut-away sector is in the path of the beam. With a double-beam system, a cut-away sector of 180° may be used so that when the first path is blocked the second is allowed through and vice versa. One or both sides of the disc may be formed as mirrors to facilitate beam switching and to allow use of more than two beams for background compensation purposes or for analysis of more than one substance within a sample.

In UV/visible absorption spectrophotometry systems using a conventional rotating disc as the light modulator it has been usual to use a positional detector with the rotating disc in order to synchronise its movement with the means processing the signals from the radiation detector (which means is referred to hereinafter as "processing means"). The positional detector may take the form of a photo-transistor positioned close to the rotating disc which produces signals in dependence on the position of the disc. Alternatively, a small permanent magnet may be attached to the disc and a reed switch may be placed close to the disc to produce signals as the disc rotates. Alternatively, at least a portion of the disc may be composed of soft iron and a coil placed close to the disc may be used to detect the rotation of the disc. All these arrangements for controlling the timing of the operating means derive their synchronising signals from the radiation modulating means, i.e. the rotating disc, and therefore involve extra complications and cost as a result of the extra control equipment. As a possible alternative to a positional detector and ancilliary equipment, the processing means might be controlled by means of the alternating mains voltage; and a synchronous motor, powered by the mains voltage, might be used to drive the rotating disc. Such a system may be unsatisfactory for various reasons.

Firstly, there is a difficulty in maintaining a specific and constant phase relationship between the mains voltage and the position of the disc, because most multi-polar motors would involve an ambiguity in the position of the disc as a result of ambiguity in the possible stopping position of the motor. Secondly, even if a self-phasing motor, i.e. one which is designed to maintain a specific and constant relationship with the mains voltage, were to be used its performance may not be adequate for UV/visible absorption spectrophotometry. This is because the speed of the motor tends to "hunt" about the mains frequency, especially when the mains frequency is varying. This is likely to cause the rotating disc to loose its synchronism with the operating means. Thirdly, synchornous motors tend to be too big, expensive and unreliable for convenient use in UV/visible absorption spectrophotometers. A further disadvantage of modulating arrangements using a rotating disc is that they have a tendency to wear out due to the long periods of use and to the high rotational speeds that are used. Moreover, when a synchronous motor is not used special motor speed control arrangements are likely to be required to ensure the radiation modulation occurs at the desired frequency.

According to one aspect of the invention there is provided a radiation detecting system in which radiation from a sample impinges on a radiation detector, the system including modulating means for modulating radiation passing in a radiation path, and processing means for processing signals obtained from the detector; wherein both the modulating means and the processing means are drivable from the same periodically varying voltage in such manner that each has a constant and specific phase relationship with the said voltage; the modulating means comprising a radiation interrupting member connected to an armature which is movably positioned in the magnetic circuit of an electromagnet which is driven from the said voltage to produce oscillatory motion of the said member.

According to another aspect of the invention there is provided a spectrophotometry system in which radiation emitted from at least one radiation source passes along two radiation paths and impinges on at least one radiation detector, the radiation in one said path impinging on a sample and interacting therewith, the system including modulating means for modulating radiation passing in the said radiation paths, and processing means for processing signals obtained from the detector(s); wherein both the modulating means and the processing means are drivable from the same periodically varying voltage in such manner that each has a constant and specific phase relationship with the said voltage; the modulating means comprising a radiation interrupting member connected to an armature which is movably positioned in the magnetic circuit of an electromagnet which is driven from the said voltage to produce oscillatory motion of the said member. The radiation interrupting member may be a flag. In this specification the word "flag" means a member suitable for interrupting, allowing past, deflecting or splitting a beam of radiation by virtue of changes of position of the flag. Normally the flag will be a rigid two-dimensional member. If required, one or both sides of the flag may be mirrors.

An embodiment of the invention will be described by way of example with reference to the accompanying drawings, in which.

Figure 1:
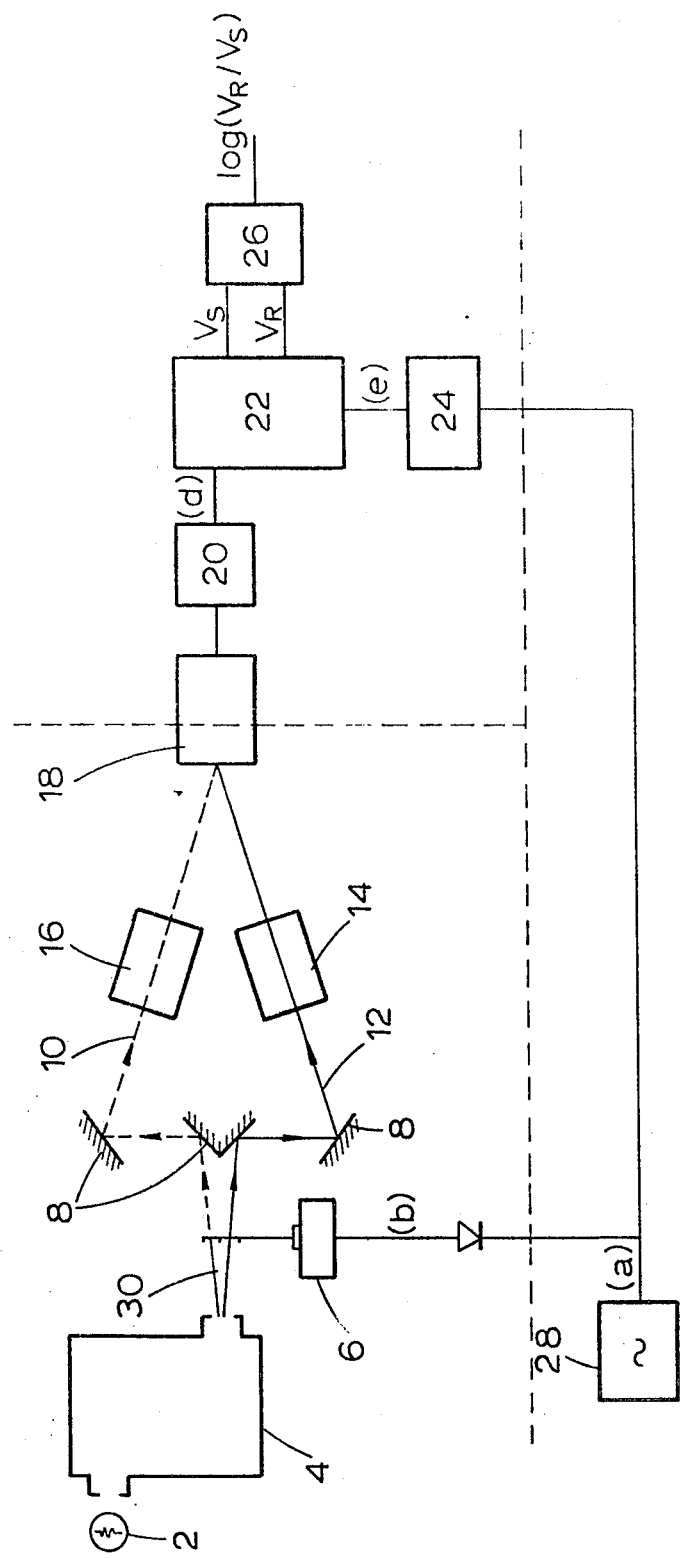
FIG. 1 is a schematic diagram of an ultra-violet or visible absorption spectrophotometer system according to the invention.

In FIG. 1, the optical part of the system comprises a source of light 2, a monochromator 4, a modulator 6, mirrors 8, two light paths 10, 12, a sample cell 14, a reference cell 16 and a photo-detector 18. The light beam from the monochromator 4 is split into two alternately-chopped beams by the modulator 6 (described below). Mirrors 8 separate the two chopped beams and direct them along either a sample path 12 including a sample cell 14 or a reference path 10 including a reference cell 16. The two light paths recombine at the photo-detector 18. Other necessary and well-known components such as lenses and attenuators which will be present in the light-paths are not illustrated in the Figure. Pulses of light from the paths 10, 12 respectively arrive alternately at the detector 18.

The photo-detector 18 is a photo-multiplier tube and produces an electrical signal whose strength varies in dependence on the intensity of the light impinging on it.

Figure 4:
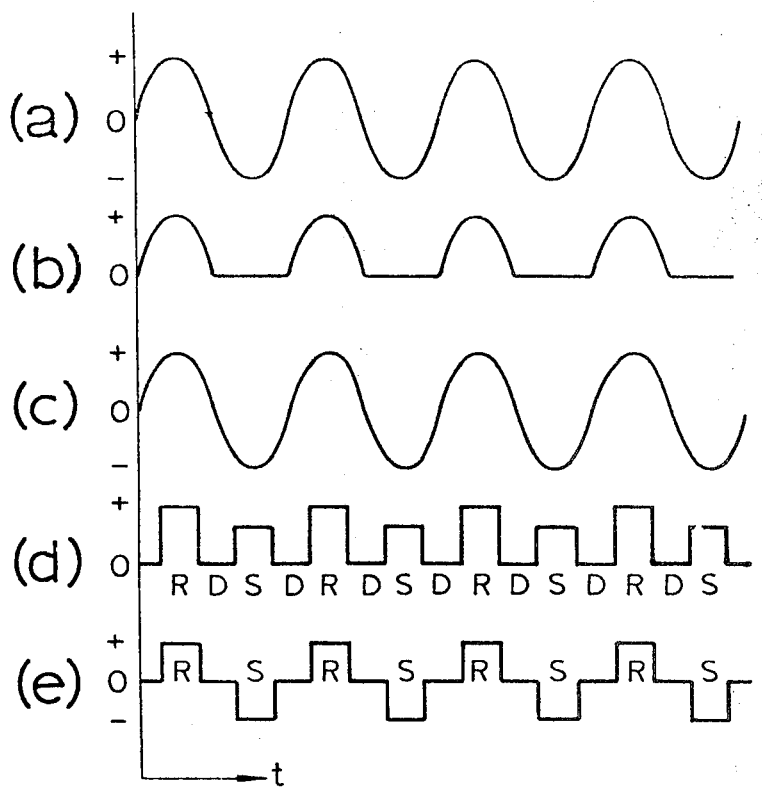
FIG. 4 illustrates various signals which occur in the system.

The means for processing signals obtained from the detector 18 (i.e. the processing means) includes a pre-amplifier 20, a demodulating circuit 22, a pulse shaping and timing circuit 24 and a ratio-ing circuit 26. Some signals in the system are indicated by reference letters in FIG. 1, and are shown in FIG. 4. The signals from the detector 18 pass to the preamplifier and thence to the demodulator 22. The demodulator receives timing pulses from the circuit 24 which pulses are synchronised with, and serve to identify, the sample signals S and reference signals R from the preamplifier 20 (as described below). The demodulator is thereby able to separate the signals S and R and to produce two voltages $V_s$, $V_r$ representative of light arriving at the detector 18 via the sample 12 and reference 10 light paths respectively.

These voltages are passed to the circuit 26 which produces a voltage equal to log $(V_r/V_s)$, which represents the absorbance due to the sample.

The modulator 6 is driven by means of an alternating voltage derived from and in phase with an a.c. mains supply 28. The modulator is self-phasing, i.e. the action of chopping the light beam has a constant and specific phase relationship to the phase of the driving voltage, as described below. An alternating voltage from the mains supply is also transmitted to the pulse timing and shaping circuit 24, which produces a train of square wave pulses which have a specific and constant phase relationship to the phase of the alternating voltage.

Figure 2:
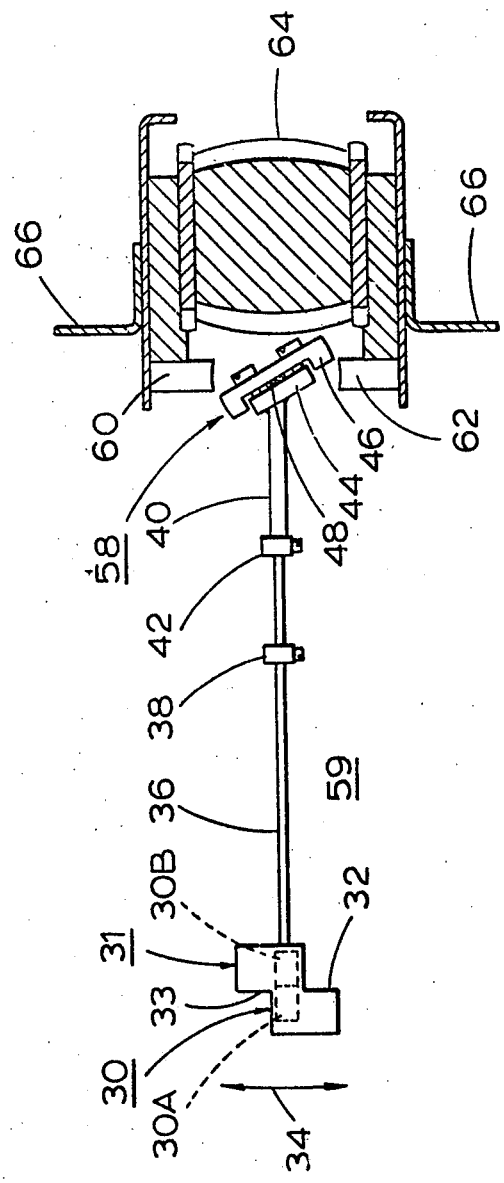
FIGS. 2 and 3 illustrate a novel radiation modulator used in the system of FIG. 1, FIG. 2 being a sectional view along the line II — II of FIG. 3.
Figure 3:
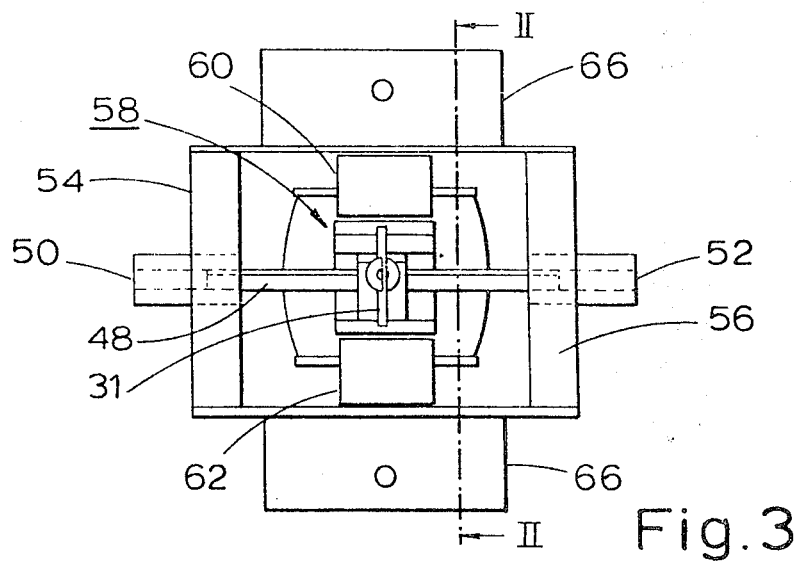

The novel modulator 6 used in the present embodiment is shown in FIGS. 2 and 3. The modulator is arranged so that a light beam 30 (indicated in cross-section in FIG. 2 by broken lines) from an exit slit of the monochromator 4 (FIG. 1) is interrupted by a rigid flag 31. The flag, which is formed from metal sheet, is so shaped that when it oscillates in the directions indicated by the arrows 34 it blocks off, in succession, the whole of the light beam, the left hand half 30A of the beam, the whole beam, the right hand half 30B, the whole beam and so on. The edges 32, 33 of the flag are bent through 90° to reduce any tendency to scatter light between halves 30A and 30B of the beam. The respective halves 30A and 30B of the beam 30 pass along the reference and sample paths 10 and 12 respectively.

The flag 31 is fixed to a rod 36 which carries a polythene weight 38 which can be clamped at any position along the rod to adjust the natural resonance frequency of oscillation of the modulator, as described below. The rod 36 is slidable telescopically in a stainless steel tube 40 and clamped by a polythene clamp 42. The tube 40 is fixed to a soft-iron member 44 which is attached by means of screws to a further soft-iron member 46, and a spring steel strip 48 is clamped between members 44, 46. As shown in FIG. 3 the ends of the strip 48 are inserted in split rods 50, 52 which are clamped, by grub screws not shown, in holes through bearing support members 54, 56. The split rods 50, 52 extend outwardly beyond the support members. The strip 48 provides a mounting, and also a bearing which exerts a restoring torque, for the soft-iron members 44, 46 which together form an armature 58. The rod 36, weight 38, tube 40 and clamp 42 together constitute an arm 59 linking the flag 31 to the armature 58. The mounting arrangement is such that the armature 58 is inclined at an angle of about 30° to the line between two shaped pole pieces 60, 62 of the yoke of an electromagnet 64. The armature is thus mounted for rotation about the centre of the gap between the pole pieces 60, 62. (Fixing screws etc. for supporting the electromagnet and its yoke are not shown). Two right angle brackets 66 attached to the electromagnet structure enable the modulator to be mounted in such a manner that the position of the flag 31 in the direction of the arrows 34 can be accurately adjusted. For example, the outer parts of each of the split rods 50, 52 may be placed in saddle-shaped brackets on the spectrophotometer; enabling the modulator to be rotated about the axis of the split rods by adjustment of screws passing through holes in the plates 66 and screwing into plates on the spectrophotometer.

In the present enbodiment, the modulation is orientated so that when the electromagnet 64 is un-energised and the flag 31 is stationary, the position of the flag in relation to the beam 30 from the monochromator is as shown in FIG. 2. When the electromagnet 64 is energised the ends of the armature 58 tend to be pulled towards the pole pieces 60, 62. Thus the armature rotates about the axis of the strip 48 against the increasing restoring torque of the strip, and the flag moves upwards to allow the part 30B of the beam to pass. When the electromagnet is de-energised, the restoring action of the strip 48 moves the flag 31 downwards beyond the rest position shown in FIG. 2 so that part 30A of the beam 30 is allowed to pass.

The electromagnet 64 may be driven directly from the a.c. mains supply, in which case the flag 31 will oscillate at twice the mains frequency, since the armature 58 will be attracted into the gap at each half cycle. In the present embodiment, however, a rectifying diode is provided in the electromagnet circuit so that the flag 31 oscillates at the mains frequency, and the pulse timing circuit 24 (FIG. 1) is arranged accordingly.

The amplitude of oscillation of the flag 31, determined largely by the properties of the strip 48, is about 1 cm which is suitable for splitting and modulating the beam from a monochromator. If the frequency at which the modulator is being driven is near to the resonance frequency of the torsional mounting arrangement, the amplitude of the flag oscillation is to some extent frequency dependent. If the amplitude is frequency dependent, fluctuations in the mains frequency may affect the accuracy of the movement of the flag 31 relative to the beam 30. Therefore it is preferable for the system to be 'de-tuned', that is for the resonance frequency of the mounting arrangement (and sub-harmonics and harmonics thereof) to have values well away from the driving frequency. Thus for example if the driving frequency is 50 Hz, a suitable value for the resonance frequency is 68 Hz (having a sub-harmonic at 34 Hz); whereas if the driving frequency is 60 Hz, a suitable resonance frequency is 80 Hz (with a sub-harmonic at 40 Hz). The resonance frequency can readily be adjusted by altering the movement of inertia of the flag 31 and arm 59 about the bearing. This can conveniently be achieved, without affecting other parameters of the dimensions of the arrangement, by altering the position of the weight 38 along the rod 36. If the modulator is de-tuned in this fashion, then the amplitude of oscillation will only be affected by gross changes (e.g. of the order of 10%) in frequency.

The mechanical arrangement of the modulator outlined above is found to be particularly suitable for beam modulating for spectrophotometric purposes, for the following reasons.

a. Compared with a rotating disc arrangement for example, an electric motor is replaced by the electromagnet 64 which is likely to be simpler, cheaper, and more reliable for accurate long-term use. Moreover, there are no axle-type bearings so that considerable reduction in wear is likely.

b. Compared with oscillating rotating arrangements such as are sometimes used in other fields of technical application — such as electric dry shavers — the torsional mounting and bearing arrangement is particularly advantageous. An axle-type bearing in such an arrangement tends to cause high wear, especially when the angle of rotation is small (in the present case about 5° in each direction). This is aggravated when the restoring arrangement involves biasing springs, since these generally involve a linear force which acts transverse the axis of rotation. In the present arrangment the restoring action derived from the mounting strip 48 is purely torsional.

c. The dynamic characteristics of the modulator are suitable, a high torque being applied initially as the armature 58 is pulled into the gap, while the restoring torque increases smoothly with deflection and the reversal in the direction of rotation occurs without superimposed vibrations.

d. The arrangement also allows accurate location of the flag 31 moving at the end of the arm since there need be no slackness in the mounting arrangement.

e. Compared with other arrangements such as tuning forks and piezoelectric crystals which could be used to drive an oscillating flag, the power that it is practicable to provide is greater, so that the arrangement can be operated in a de-tuned manner well away from its resonance frequency, as described above.

The operation of the light modulating and signal processing system shown in FIG. 1 will now be described.

The voltage provided by the mains supply 28 is indicated by curve $a$ in FIG. 4. This a.c. voltage is rectified and applied to the modulator 6 so as to produce a voltage as shown in curve $b$ in the windings of the electromagnet 64. This causes the armature 58 and hence the flag 31 to move against the restoring action of the torsional strip 48 with a motion indicated by curve c. As described above, the flag motion allows light to pass alternately along the sample 12 and reference 10 light paths in alternate time periods which are separated by time periods during which both the light paths are blocked. The light pulses which arrive at the photodetector 18 as a result of this light modulation, and the resultant electrical signals passed on to the demodulating circuit 22, are represented by curve d in FIG. 4. In this curve the reference letter R indicates pulses produced when the modulator's flag 31 passes light via the reference light path 10, S indicates pulses produced when light passes in the sample light path 12, and D indicates periods when the flag 31 is blocking light in both of the paths. Because of the manner of operation of the modulator 6, the signals R and S have a simple and unambiguous relation to the phase of the a.c. signal in curve a. The mains a.c. voltage shown in curve a of FIG. 4, is also applied to the pulse shaping and timing circuit 24. The circuit 24 is arranged to produce pulses, such as are shown in curve e, which bear a simple and unambiguous relation to the phase of the a.c. signal, curve a, from which they are derived. The pulses in curve e are shown for the purpose of illustration as being square pulses of successively opposite polarity, but any convenient distinguishable signal-forms may be used.

The circuit 24 is arranged so that the timing, relative to the phase of curve a, of for example the leading edges of the pulses in curve e can be adjusted so as to take account of any fixed phase differences which may be present (such as time delays caused by the operation of the modulator 6 or the photodetector 18). Thus each signal from the circuit 24 is used by the demodulator circuit 22 to determine whether the signal being received from the preamplifier 20 is derived from the reference or from the sample cells. From these signals the demodulator circuit produces two d.c. voltages, Vs and Vr, which are measures of light transmitted via the sample and reference cells respectively. The voltages Vs, Vr pass to the ratio-ing circuit 26 which produces an output of log (Vr/Vs) which indicates the absorbance of the sample.

Apart from the mechanical characteristics of the modulator 6 itself, the invention provides automatic synchronisation of the light modulating and signal processing aspects of a spectrophotometric double-beam system, without some of the disadvantages of some of the prior art systems mentioned in the early part of this specification.

It will be appreciated that the novel modulator described by way of example above could with minor modifications be used in various systems in which radiation is detected and in which there is required automatic and simple synchronisation between modulation of the radiation and operation on signals from the detectors. Such systems may use such radiation as electronic, ionic or molecular beams, or nuclear radiation.

What we claim is:

1. A spectrophotometry system, comprising:
   a source for a radiation beam;
   an electromagnet having a magnetic circuit with an air gap;
   an armature torsionally mounted within said air gap, energization of said electromagnet causing a magnetic force which tends to rotatably displace said armature against a torsional restoring force;
   an arm having one end thereof secured to said armature so that said arm swings when said armature is rotatably displaced;
   an optical element mounted on the other end of said arm to swing therewith for modulating the radiation beam from said source;
   means for energizing said electromagnet with a periodic electrical signal having a frequency that is not close to the natural mechanical resonance frequency of said torsionally mounted armature, arm and optical element, or any harmonic or subharmonic thereof, so that said armature, arm and optical element oscillate at said frequency without having the amplitude of oscillation substantially dependent upon said frequency;
   means for positioning a sample in the modulated radiation beam;
   a radiation detector for detecting modulated radiation coming from the sample; and
   processing means for said detected radiation synchronized with said periodic electrical signal energizing said electromagnet.

2. The system of claim 1 wherein said optical element comprises a rigid opaque sheet for periodically interrupting at least a portion of the radiation beam.

3. The system of claim 1 wherein said armature is mounted within said air gap via a torsion strip adapted to be twisted about its axis by the magnetic force resulting from energization of said electromagnet and to apply a counteracting restoring force.

4. The system of claim 1 wherein said arm further comprises a weight attached thereto having an adjustable position in the longitudinal direction for adjusting the natural resonance frequency of the mechanical oscillation of said armature, arm and optical element.

5. The system of claim 1 wherein said optical element oscillates between a first position where it prevents radiation from passing along a first path and a second position where it instead prevents radiation from passing along a second path.

6. The system of claim 5 wherein said radiation detector detects radiation passing along either of said first or second paths.

* * * * *